(No Model.)
J. F. WRIGHT.
ARTIFICIAL TOOTH.
No. 448,745. Patented Mar. 24, 1891.
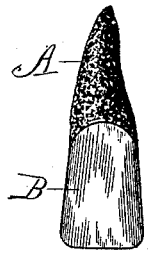
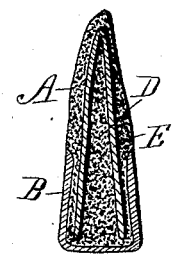
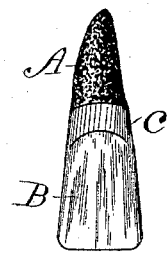
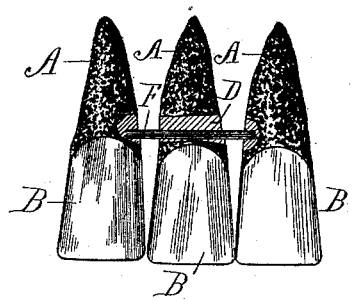
Witnesses:
Harry P. Williams
John H. White
Inventor,
Joel F. Wright
by Albert H. Walker Atty

UNITED STATES PATENT OFFICE.

JOEL F. WRIGHT, OF HARTFORD, CONNECTICUT.

ARTIFICIAL TOOTH.

SPECIFICATION forming part of Letters Patent No. 448,745, dated March 24, 1891.

Application filed January 5, 1891. Serial No. 376,703. (No model.)

*To all whom it may concern:*

Be it known that I, JOEL F. WRIGHT, of Hartford, Connecticut, have invented a new and useful Improvement in Dentistry, of which the following description and claim constitute the specification, and which is illustrated in the accompanying sheet of drawings.

This invention consists in a porcelain tooth constructed and adapted to be permanently implanted in the place of a natural tooth.

Figure 1 of the drawings is a front view of an upper front tooth embodying this invention. Fig. 2 is a vertical central section through the width of the tooth of Fig. 1. Fig. 3 is a front view of an upper front tooth like Fig. 1, except that it is provided midway of its length with a portion of surface made in form and color to imitate the gum adjacent to a natural front tooth. Fig. 4 is a front view of three upper front teeth, each of which is substantially like the tooth of Fig. 1, except that it is provided with a cylindrical aperture or recess extending in the direction of the width of the tooth near the junction of the crown and the root for the reception of a wire of gold or other suitable metal, and this figure shows such a wire extending through such an aperture in one tooth and into such a recess in each of the other two teeth of that figure.

The letter A indicates the root, and the letter B indicates the exterior enamel wall of the crown of the porcelain tooth in each of the figures.

The letter C in Fig. 3 indicates that part of the surface of the tooth which is made to imitate in form and color that part of a natural gum which is adjacent to a natural front tooth.

The letter D in Fig. 2 indicates the interior substance of both the root and the crown of the tooth, and the letter E indicates a double metallic core, which may be made and put lengthwise in that substance to increase the strength of the tooth.

The letter F indicates a wire of gold or other suitable metal, which occupies an opening through the middle tooth of Fig. 4 and extends into a recess in each of the other teeth of that figure.

A porcelain tooth for implantation—such as either of those shown in the drawings—is made of the minerals heretofore used in the construction of artificial teeth, such as feldspar, silex, kaolin, &c.; but, unlike former manufactures of artificial teeth, a tooth embodying the present invention, while having its crown enameled or glazed, must have a root shaped as nearly as practicable like that of a natural tooth, and that root must consist of a strong porous mineral substance or structure left entirely bare of glaze or enamel. In some cases the mineral substance of which the body of the tooth is made will be strong enough without re-enforcement; but in other cases that strength may be increased by making and putting a core of platinum or of an amalgam of platinum and iridium or of some other metal in the interior of the body of the tooth before it is baked. The letter E in Fig. 2 indicates a double core of suitable form for this purpose, and the form of such a core may be varied in many ways. So, also, in a case where a tooth is to be inserted in a gum which has not receded from its original position the root of a tooth like that of Fig. 1 may be inserted so as to be entirely covered without covering any part of the crown of the tooth, thus leaving the natural gum in its natural position relevant to the root and to the crown; but where a tooth is to be inserted in a gum which has materially receded from its natural position that tooth is preferably made with an intermediate surface, (indicated by the letter C in Fig. 3,) and that intermediate surface is formed and colored in imitation of the natural gum, so as to supplement in appearance the deficiencies of the latter.

In a case where a single porcelain tooth is to be implanted between two natural teeth it may generally be implanted without any permanent or any temporary connection with them, and in such a case the tooth of Fig. 1 or the tooth of Fig. 3 is applicable; but where several porcelain teeth are to be implanted side by side it will generally be expedient, and will sometimes be necessary, to temporarily connect those teeth together by a wire, as indicated in Fig. 4, in order that they shall remain in proper alignment until their roots are encysted in the natural tissues in which they are inserted.

The manufacture of these porcelain teeth for implantation is preferably completed by saturating and covering their roots with an aseptic preparation of gelatine or other equivalent vehicle of the aseptic agent; but where the manufacturer does not thus saturate and cover the roots of the teeth which he produces the dentist should apply an approved aseptic agent to the root of each tooth before he implants it in the mouth.

The implantation of one of these porcelain teeth consists in selecting one which conforms as nearly as possible or desirable in size, shape, and other requisites to the missing natural tooth for which it is to be substituted, and in cutting a proper cavity in the mucous membrane of the mouth, extending, if practicable, into the alveolar ridge, and in firmly inserting the root of the porcelain tooth in that cavity. When one or more porcelain teeth are thus implanted in the mouth, the adjacent natural tissues flow and penetrate into and through the artificial reticulum which the root of that tooth constitutes, and that encysting process continues until the root is firmly and permanently implanted in its proper place in the mouth.

I claim as my invention—

An artificial tooth made of porcelain or its equivalent, and having its crown provided with a surface of enamel, and having the surface and interior of its root formed and made porous, substantially as described.

JOEL F. WRIGHT.

Witnesses:
ALBERT H. WALKER,
JNO. H. WHITE.